(12) United States Patent
Kawaguchi

(10) Patent No.: US 10,469,680 B2
(45) Date of Patent: Nov. 5, 2019

(54) INFORMATION PROCESSING APPARATUS TRANSMITTING EXECUTION COMMAND OF FUNCTION, AND NON-TRANSITORY COMPUTER-READABLE RECORDING MEDIUM STORING COMPUTER-READABLE INSTRUCTIONS FOR THE INFORMATION PROCESSING APPARATUS

(71) Applicant: Brother Kogyo Kabushiki Kaisha, Nagoya (JP)

(72) Inventor: Masafumi Kawaguchi, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 0 days.

(21) Appl. No.: 16/027,587

(22) Filed: Jul. 5, 2018

(65) Prior Publication Data

US 2019/0037087 A1    Jan. 31, 2019

(30) Foreign Application Priority Data

Jul. 27, 2017 (JP) ................................ 2017-145229

(51) Int. Cl.
*H04N 1/00* (2006.01)
(52) U.S. Cl.
CPC ....... *H04N 1/00411* (2013.01); *H04N 1/0044* (2013.01); *H04N 1/00482* (2013.01); *H04N 1/00503* (2013.01)

(58) Field of Classification Search
CPC combination set(s) only.
See application file for complete search history.

(56) References Cited

U.S. PATENT DOCUMENTS

| | | | |
|---|---|---|---|
| 9,392,132 B1 * | 7/2016 | Iwasaki | H04N 1/00411 |
| 2005/0159926 A1 | 7/2005 | Saito | |
| 2006/0090143 A1 * | 4/2006 | Tanaka | G06F 3/0482 |
| | | | 715/810 |

FOREIGN PATENT DOCUMENTS

| | | |
|---|---|---|
| JP | 2006-189920 A | 7/2006 |
| JP | 2009-205694 A | 9/2009 |

* cited by examiner

*Primary Examiner* — Helen Zong
(74) *Attorney, Agent, or Firm* — Burr & Brown, PLLC

(57) ABSTRACT

A processor of an information processing apparatus receives a first setting for a first setting item among a plurality of setting items for an image processing function of an image processing apparatus via an each-time setting window. The processor receives a second setting for the second setting item via a detailed setting window. The processor transmits a first execution command of the image processing function to the image processing device in a case where the display instruction is received. The first execution command is based on the first setting and the second setting. The processor transmits a second execution command of the image processing function to the image processing device in a case where the display instruction is not received via the operation interface. The second execution command is based on the first setting and the default setting for the second setting item.

10 Claims, 13 Drawing Sheets

INFORMATION PROCESSING APPARATUS TRANSMITTING EXECUTION COMMAND OF FUNCTION, AND NON-TRANSITORY COMPUTER-READABLE RECORDING MEDIUM STORING COMPUTER-READABLE INSTRUCTIONS FOR THE INFORMATION PROCESSING APPARATUS

CROSS REFERENCE TO RELATED APPLICATION

This application claims priority from Japanese Patent Application No. 2017-145229 filed Jul. 27, 2017. The entire content of the priority application is incorporated herein by reference.

TECHNICAL FIELD

The present disclosure relates to an information processing apparatus for satisfying various needs of users concerning function setting.

BACKGROUND

A multifunction peripheral is widely used in an office environment. The multifunction peripheral typically has scanning, printing, and facsimile functions, and is connected to an information processing apparatus such as a PC over a network such as a LAN. A user often uses the information processing apparatus to select the one of functions to be executed by the multifunction peripheral.

A user may modify settings e.g., a paper size, a printing direction, and the number of copies, by operating a print setting window displayed on the information processing apparatus, and instruct executing a printing function.

A great many setting items for the printing function of the multifunction peripheral may provide, the user with difficulties to find his or her desired setting item from among the many setting items.

Japanese Patent Application Publication No. 2009-205694 discloses a technique that enables the user to select setting items using a customization tool in a host computer. Here, the print setting window displays the user selected setting items in a manner that settings are configured to be set for therefore. Specifically, the user uses the customization tool and creates "favorite" including his or her desired setting items to be displayed on the print setting window. Then, on the print setting window, the user changes a setting item display mode from "standard setting" mode to "favorite" mode. In the "standard setting" mode, all setting items are displayed such that settings are ready to be changed. In the "favorite" mode, the user's desired setting items are displayed such that those settings are ready to be changed while other setting items are displayed in a grayed-out manner so that those settings are not accessible by the user.

SUMMARY

According to the technique explained above, the user creates "favorite" such that only desired setting items are displayed on the print setting window in a manner that settings can be set for the desired setting items, thereby saving the load of searching the plurality of setting items for the user desired setting item. In this case, however, the user cannot set the setting items other than the desired setting items. That is, the above conventional technique cannot appropriately satisfy both a demand to save the load of searching the desired setting item and a demand to perform the setting for the setting item other than the desired setting item, in accordance with situation changes. This issue would come out not only when performing the printing function but also when performing other functions such as the scanning function or the facsimile function.

The following disclosure provides a non-transitory computer-readable recording medium storing computer-readable instructions for an information processing apparatus. The information processing apparatus includes: an operation interface; a display; a communication interface configured to communicate with an image processing device having an image processing function which is performed with settings for a plurality of setting items including a first setting item and a second setting item; a processor; and a storage storing a default setting for the second setting item. The computer-readable instructions, when executed by the processor, cause the information processing apparatus to perform: receiving through the operation interface a designation operation designating the first setting item for which a setting is to be set in an each-time setting window; displaying the each-time setting window on the display provided that an execution instruction is received via the operation interface, the execution instruction to execute the image processing function; receiving through the operation interface a first setting for the first setting item among the plurality of setting items via the displayed each-time setting window; displaying a detailed setting window on the display provided that a display instruction is received through the operation interface after the execution instruction is received; receiving through the operation interface a second setting for the second setting item which is not designated by the designation operation via the displayed detailed setting window; transmitting a first execution command of the image processing function to the image processing device in a case where the display instruction is received through the operation interface, the first execution command being to execute the image processing function based on the first setting set for the first setting item and the second setting set for the second setting item; and transmitting a second execution command of the image processing function to the image processing device in a case where the display instruction is not received through the operation interface, the second execution command being to execute the image processing function based on the first setting for the first setting item and the default setting for the second setting item.

According to another aspect, the following disclosure provides an information processing apparatus. The information processing apparatus includes: an operation interface; a display; a communication interface configured to communicate with an image processing device having an image processing function which is performed with settings for a plurality of setting items including a first setting item and a second setting item; a processor; and a storage storing a default setting for the second setting item, and computer readable instructions. The computer readable instructions, when executed by the processor, causes the information processing apparatus to perform: receiving through the operation interface a designation operation designating the first setting item for which a setting is to be set in an each-time setting window; displaying the each-time setting window on the display provided that an execution instruction is received via the operation interface, the execution instruction to execute the image processing function; receiving through the operation interface a first setting for the first setting item among the plurality of setting items via the displayed each-time setting window; displaying a detailed setting window on the display provided that a display instruction is received through the operation interface after the execution instruction is received; receiving through the operation interface a second setting for the second setting item which is not designated by the designation operation via the displayed detailed setting window; transmitting a first execution command of the image processing function to the image processing device in a case where the display instruction is received through the operation interface, the first execution command being to execute the image processing function based on the first setting set for the first setting item and the second setting set for the second setting item; and transmitting a second execution command of the image processing function to the image processing device in a case where the display instruction is not received through the operation interface, the second execution command being to execute the image processing function based on the first setting for the first setting item and the default setting for the second setting item.

BRIEF DESCRIPTION OF THE DRAWINGS

The particular features and advantages of the disclosure as well as other objects will become apparent from the following description taken in connection with the accompanying drawings, in which:

FIG. 11D is a view illustrating an example of an each-time setting window;

DETAILED DESCRIPTION

Embodiments of the present disclosure will be explained while referring to drawings. While the disclosure has been described in detail with reference to the above embodiments, it would be apparent to those skilled in the art that various changes and modifications may be made thereto.

[First Embodiment]

Figure 1:
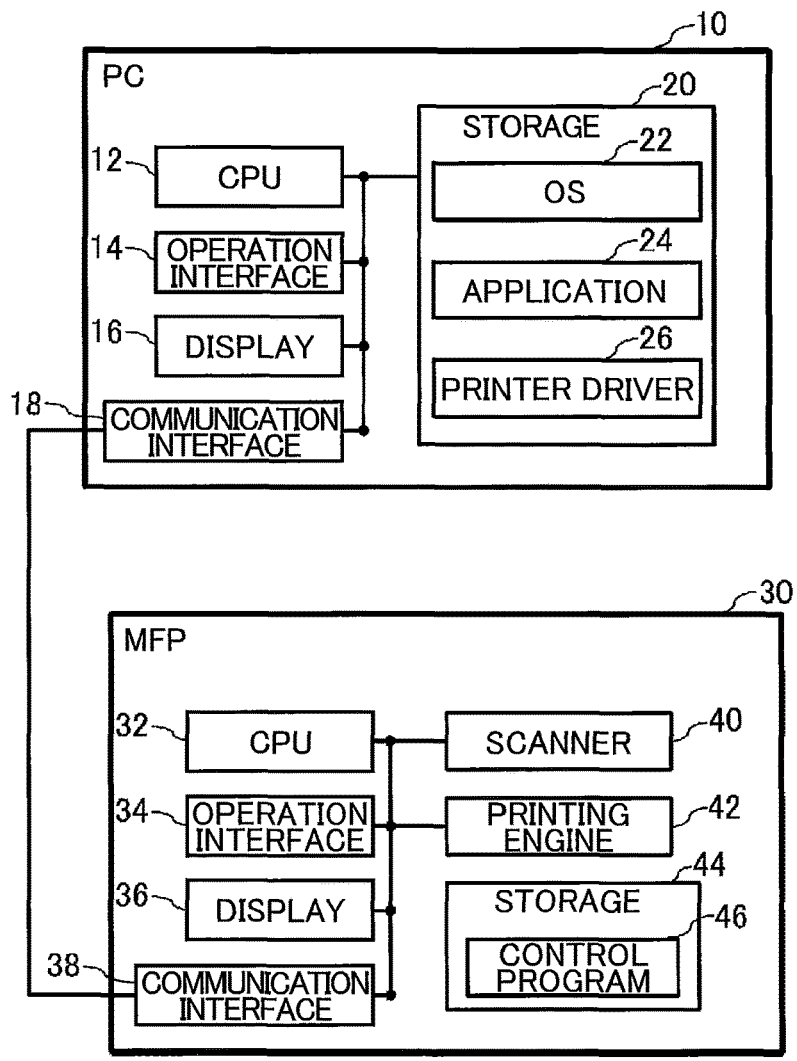
FIG. 1 is a block diagram illustrating a PC and an MFP according to a first embodiment.

FIG. 1 is a block diagram illustrating a PC 10 to which a driver program 26 is installed, and an MFP (Multifunction Peripheral) having a plurality of functions such as a print function and a read function.

(PC 10)

The PC 10 includes a CPU 12, an operation interface 14, a display 16, a communication interface 18, and a storage 20. These components of the PC 10 are mutually connected to each other.

The CPU 12 executes an application 24 and a printer driver 26 which are stored in the storage 20 to execute various functions of the PC 10.

The operation interface 14 includes an input device such as a keyboard or a mouse. The operation interface 14 transmits to the CPU 12 a signal based on a user's operation via the input device for executing functions of the PC 10. A user may input his or her desired instruction by operating the operation interface 14. The operation interface 14 may be a touchscreen over the display 16. The display 16 displays various function information of the PC 10 according to a command from the CPU 12.

The communication interface 18 includes a network interface for connection with a network such as a LAN or Internet and a USB interface for connection with an external storage such as a USB flash drive memory. The PC 10 is configured to communicate with the MFP 30 through the communication interface 18.

The storage 20 includes a RAM, a ROM, a non-volatile memory, and an HDD, and is capable of storing therein an OS 22, the application 24, and the printer driver 26.

The OS 22 is a program that provides a function to display various images on the display 16 and basic functions used by the application 24. The OS 22 also provides an Application Programming Interface (API) that is used by applications for instructing various hardware components.

The application 24 is provided by a vender of the MFP 30. Examples of the application 24 include word-processing software, spreadsheet software, and image editing software.

The printer driver 26 is of device driver software for controlling the MFP 30 from the PC 10. The printer driver 26 of the present disclosure has a "favorite setting registration function". The "favorite setting registration function" allows the user to register a user's desired combination (hereinafter, referred to merely as "favorite") of setting items to be displayed on a detailed setting window 700, and default settings for each setting item.

Figure 2:
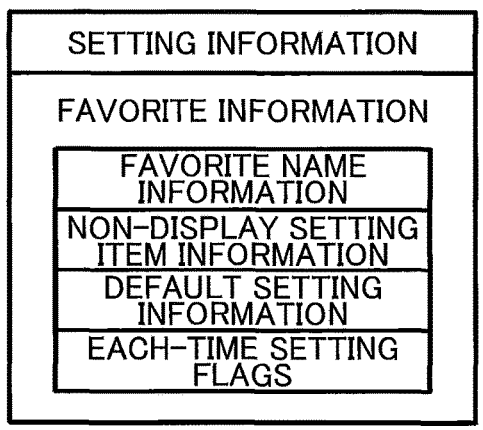
FIG. 2 is an explanatory diagram illustrating information stored in a storage of the PC according to the first embodiment.

The user may operate the printer driver 26 to store setting information and "favorite" information in the storage 20 as illustrated in FIG. 2. The setting information indicates the setting for each setting item. The setting information is updated every time the setting is set for the setting item on an each-time setting window 600 and a detailed setting window 700. The "favorite" information is used for the above-mentioned "favorite setting registration function". The "favorite" information includes "favorite" name information, non-display setting item information, each-time setting flags, and default setting information indicating a default setting for each setting item. The "favorite" name information indicates the name of each "favorite". The non-display setting item information specifies setting item(s) which is (are) displayed on neither each-time setting window 600 nor the detailed setting window 700. The default setting information indicates a default setting set for each setting item when the created "favorite" is selected. The each-time setting flag represents whether to display a setting item on the each-time setting window 600. One each-time setting flag is associated with one setting item. The each-time setting flag is one of a first value "ON" and a second value "OFF". The "ON" indicates that the setting item associated with the each-time setting flag would be displayed on the each-time setting window 600. The "OFF" indicates that the setting item associated with the each-time setting flag would not be displayed on the each-time setting window 600. The user is allowed to create the "favorite" information on a customization window 500. The storage 20 may have capability for storing a plurality of sets of the "favorite" information corresponding to a plurality of "favorites".

(MFP 30)

The MFP 30 includes a CPU 32, an operation interface 34, a display 36, a communication interface 38, an scanner 40, a printing engine 42, and a storage 44. The components of the MFP 30 are mutually connected with each other.

The CPU 32 is configured to execute a control program 46 stored in the storage 44 on the basis of various information from the operation interface 34 or various information acquired from the PC 10 through the communication interface 38 to thereby control various functions of the MFP 30.

The operation interface 34 has a plurality of buttons and keys operable by the user. The operation interface 34 is configured to transmit to the CPU 32 a signal according to user's operation. The user may input his or her desired instruction by operating the operation interface 34. An example of the display 36 is an LCD. The display 36 is configured to display various information according to a command from the CPU 32. The operation interface 34 may be a touch screen over the display 36.

The communication interface 38 includes a network interface for connection with a network such as a LAN or an Internet and USB interface for connection with an external storage such as a USB flash drive. The MFP 30 can communicate with the PC 10 through the communication interface 38.

The scanner 40 may have a configuration of a flat-bed type document table or an ADF (Automatic Document Feeder) type document table, with a known optical elements. When a scanning instruction is input through the operation interface 34 or the communication interface 38, the image scanner 40 is controlled by the CPU 32 to scan an image of a document.

The printing engine 42 may be a known print mechanism, such as, an inkjet printer. A user's instruction to execute printing through the operation interface 34 or the communication interface 38 would cause the print mechanism to be controlled by the CPU 32 to print an image.

The storage 44 may include a non-volatile memory, and is capable storing therein the control program 46. The control program 46 may be downloaded from a server connected to the MFP 30 over the Internet or may be provided by a CD-ROM recording the same. The control program 46 stored in the storage 44 is executed by the CPU 32.

(Customization Window 500)

Figure 3A:
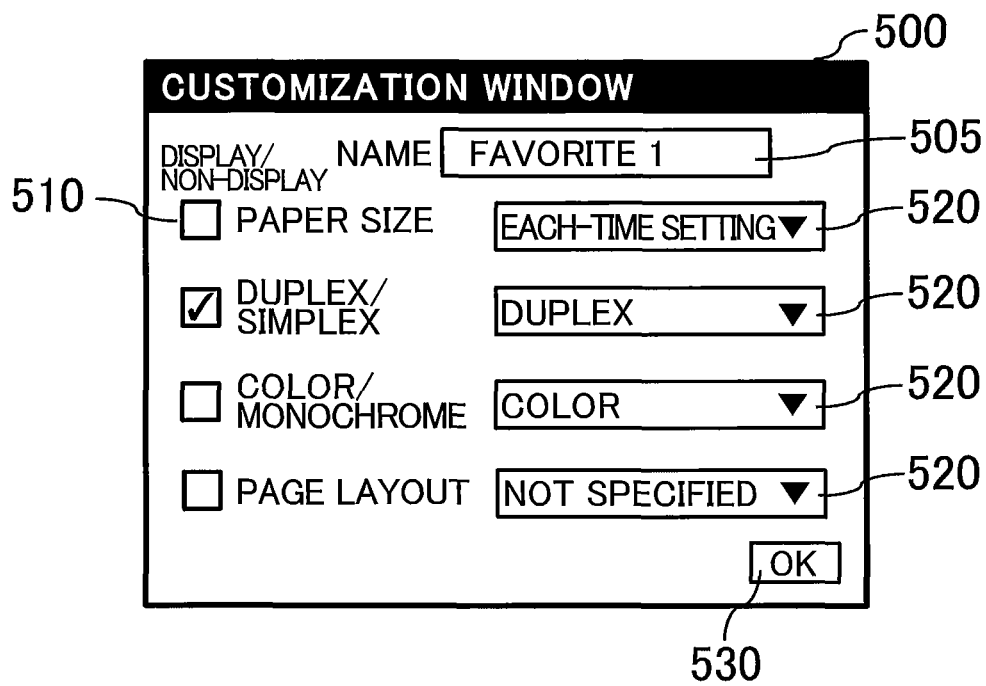
FIG. 3A is an example of a customization window according to the first embodiment.

FIG. 3A illustrates an example of the customization window 500 displayed on the display 16. The customization window 500 is used for performing the print function. The customization window 500 includes a name input box 505, check boxes 510 corresponding to the setting items, pull-down buttons 520 corresponding to the setting items, and an OK button 530. A user's various operations on the customization window 500 displayed on the display 16 through the operation interface 14 allows the user to select the non-display setting item which is displayed on neither the each-time setting window 600 nor the detailed setting window 700. The user may also select a default setting for each setting item, and an available setting item displayed on the each-time setting window 600.

In the present embodiment, the following four setting items are provided for the print function: "paper size", "duplex/simplex", "color/monochrome", and "page layout". The setting item "paper size" concerns the size of paper to be printed, and the user can select any one of "A4", "B4", "A5", "B5", and "post card" for the "paper size". The setting item "duplex/simplex" is for setting which one of duplex printing and simplex printing is performed. Setting "simplex" or "duplex" is settable for the "duplex/simplex". The setting item, "color/monochrome", indicates printing modes, i.e., indicative of which one of color printing and monochrome printing is performed. Setting "color" or "monochrome" is settable for the "color/monochrome". The setting item, "page layout", indicates the number of sets of image data included in print data corresponding to one page to be printed. Any one of settings "none", "2 in 1", and "4 in 1" is settable for the "page layout". The present disclosure is not limited to the above four setting items. Further, the term "setting" in the present disclosure includes not only a value indicating a specific content such as "A4" or "B4", but also a character string indicating a specific content such as "post card", "simplex" or "duplex" or any combination of values and character strings.

The storage 20 stores default setting information as "reference setting" for each setting item. The default setting information (reference setting) is read from the storage 20 and displayed in each setting item of the customization window 500 before a user's operation is inputted. The user edits the default setting information by performing various operations through the operation interface 14 while the customization window 500 is displayed. Accordingly, new "favorite" information is created.

The name input box 505 is displayed for receiving input of the name of the new "favorite" information. The user may input the name of "favorite" in the name input box 505 through the operation interface 14.

The check box 510 is displayed for receiving the selection of the non-display setting item and provided for each setting item. When the user selects the check box 510 through the operation interface 14, the setting item corresponding to the selected check box 510 is displayed on neither the each-time setting window 600 nor the detailed setting window 700. Once an each-time setting 550 (described later) is selected for one setting item, the check box 510 is incapable of being selected for the setting item. In contrast with the above embodiment, the setting item for which the check box 510 is selected may be displayed on both the each-time setting window 600 and the detailed setting window 700. Further, the setting item for which the check box 510 is selected may be displayed in a grayed-out manner on both the each-time setting window 600 and detailed setting window 700 so that setting of this setting item cannot be selected.

Figure 3B:
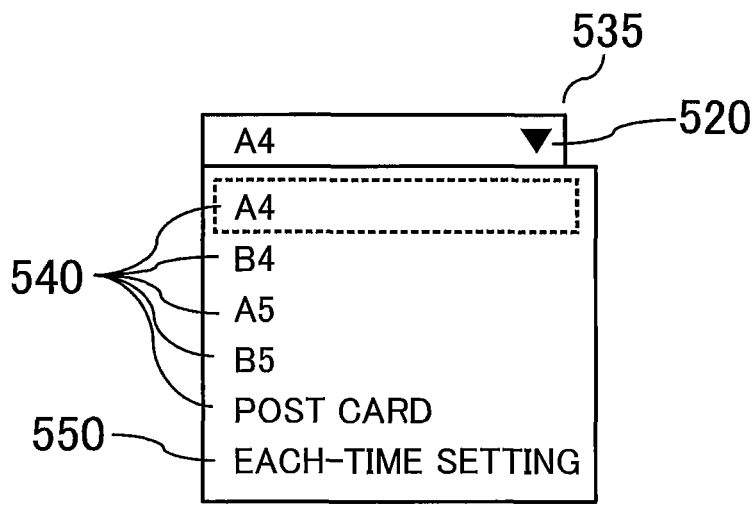
FIG. 3B is an example of a pull-down menu displayed when a pull-down button shown in FIG. 3A is selected.

FIG. 3B illustrates a pull-down menu 535 displayed on the display 16 when the user selects a pull-down button 520 through the operation interface 14. The pull-down button 520 is displayed for each setting item. When the user selects the pull-down button 520 through the operation interface 14, the pull-down menu 535 is displayed. In the pull-down menu 535, default settings 540 and an each-time setting 550 are displayed in a selectable manner. Each default setting 540 is settable as default for the setting item corresponding to the selected pull-down button 520. When the user selects the each-time setting 550 through the operation interface 14 for a setting item, the CPU 12 is configured to set the "ON" to the each-time setting flag for this setting item.

In the present disclosure, the phrase "to perform each-time setting" indicates the setting of the "ON" to the each-time setting flag of the setting item corresponding to the selected each-time setting 550.

The OK button 530 is for instructing that the creation of the "favorite" is complete. When the user selects the OK button 530 through the operation interface 14, "the customization window 500 displayed on the display 16 is closed. The "favorite" information shown in FIG. 2 is determined through the user's operation on the customization window 500.

(Each-Time Setting Window 600)

Figure 4A:
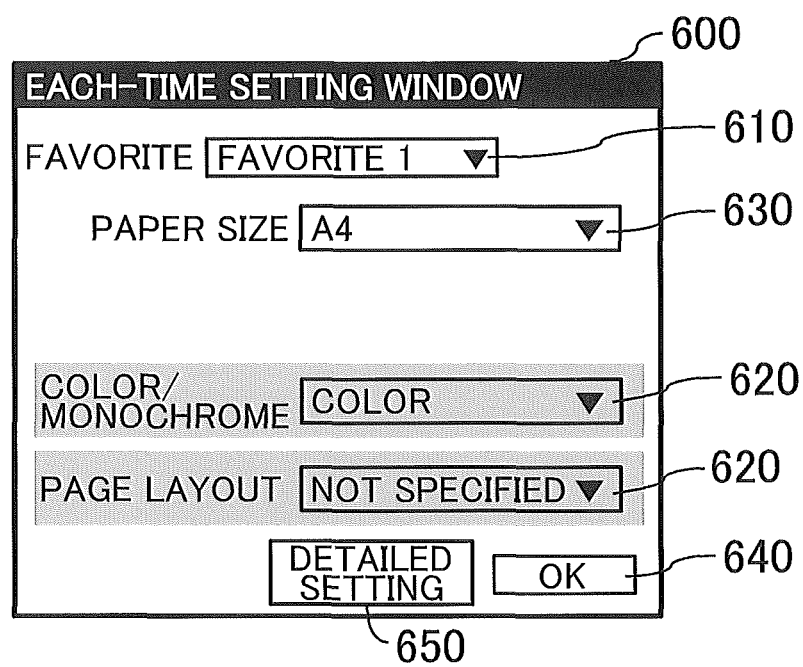
FIG. 4A is an example of an each-time setting window according to the first embodiment.

FIG. 4A illustrates an example of the each-time setting window 600 displayed on the display 16. The each-time setting window 600 includes a pull-down button 610, a pull-down button 630 corresponding to the setting item for which the each-time setting has been set, two pull-down buttons 620 for the remaining setting items excluding the non-display setting items, a detailed setting button 650, and an OK button 640. The user can perform various operations through the operation interface 14 on the each-time setting window 600 displayed on the display 16. Thus, the user performs setting for each setting item for which the each-time setting has been set on the customization window 500. FIG. 4A illustrates an example of the each-time setting window 600 when the each-time setting has been set for the setting item "paper size" on the customization window 500. On the each-time setting window 600 shown in FIG. 4A, only the setting item "paper size", for which the each-time setting has been set, is displayed so that setting is settable for this setting item. On the other hand, the remaining two setting items "color/monochrome" and "page layout" excluding the non-display setting items are displayed in a grayed-out manner so that settings are prohibited from being set for the remaining two setting items.

When the user selects the pull-down button 610 through the operation interface 14, a menu window (not illustrated) for selecting "favorite" is displayed. That is, the menu window (not illustrated) includes a list of "favorites" including the "favorite" created on the customization window 500. The user may select his or her desired "favorite" from the "favorite" list through the operation interface 14. A "reference setting" is one "favorite" provided by a manufacturer as a preset. The reference setting is selected on the each-time setting window 600 immediately after the each-time setting window 600 is displayed and before the user performs operations on the each-time setting window 600. In this state, setting is settable for each setting item. In the example of FIG. 4A, a "favorite 1" is selected, and the setting items "duplex/simplex" is not displayed.

Figure 4B:
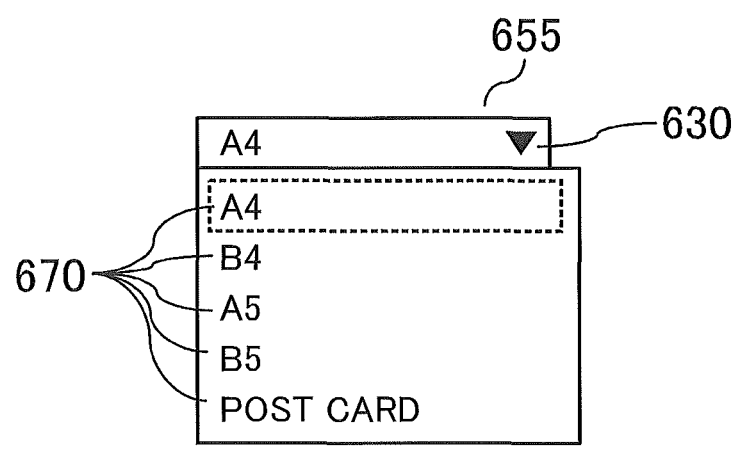
FIG. 4B is a view illustrating an example of a pull-down menu displayed when a pull-down button shown in FIG. 4A is selected.

When the user selects a pull-down button 630 through the operation interface 14, a pull-down menu 655 is displayed on the display 16. On the pull-down menu 655, settings 670 are displayed in a selectable manner. The settings 670 is settable for the setting item corresponding to the selected pull-down button 630 (FIG. 4B).

The OK button 640 is for instructing the completion of the setting for the setting item for which the each-time setting has been set. When the user selects the OK button 640 through the operation interface 14, the window on the display 16 is switched from the each-time setting window 600 to the detailed setting window 700.

The detailed setting button 650 is for instructing display of the detailed setting window 700. When the user selects the detailed setting button 650 through the operation interface 14, the window on the display 16 is switched from the each-time setting window 600 to the detailed setting window 700.

(Detailed Setting Window 700)

Figure 5A:
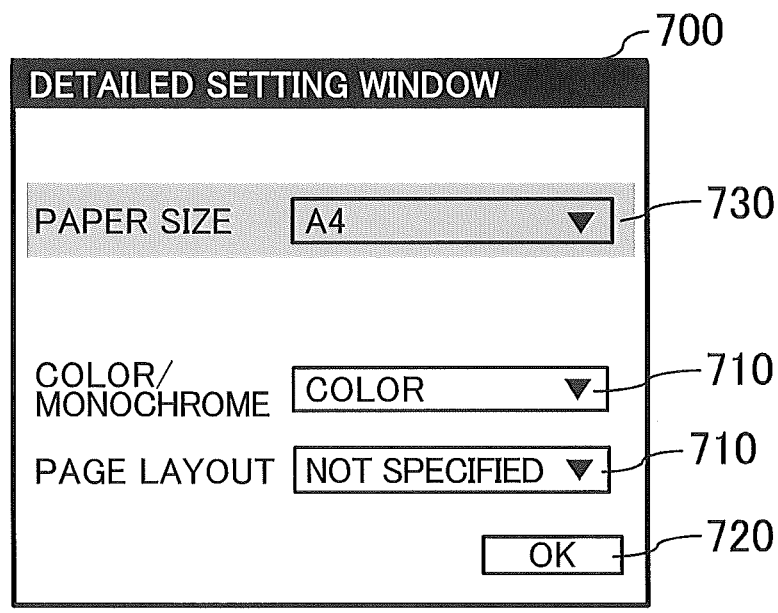
FIG. 5A is a view illustrating an example of a detailed setting window according to the first embodiment.

FIG. 5A illustrates the detailed setting window 700 displayed on the display 16. The detailed setting window 700 includes a pull-down button 730 for the setting item "paper size", two-pull down buttons 710 for the setting items "color/monochrome" and "page layout", and an OK button. The user may perform various operations on the detailed setting window 700 on the display 16 through the operation interface 14 to set settings for the two setting items "color/monochrome" and "page layout". Here, the each time settings have not been set for the two setting items "color/monochrome" and "page layout", and the two setting items "color/monochrome" and "page layout" have not selected as the non-display setting item. The setting item "paper size" for which the each-time setting has been set is displayed in a grayed-out manner so that setting is prohibited from being set therefor. Further, since the detailed setting window 700 is displayed in a state where the "favorite 1" is selected on the each-time setting window 600, the setting item "duplex/simplex" is not displayed.

Figure 5B:
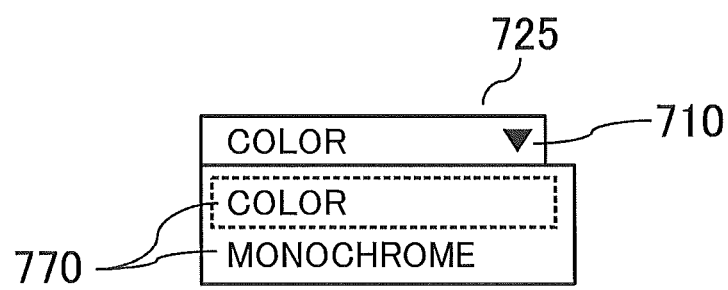
FIG. 5B is a view illustrating an example of a pull-down menu displayed when a pull-down button shown in FIG. 5A is selected.

FIG. 5B illustrates an example of a pull-down menu 725 displayed on the display 16 when the pull-down button 710 is selected. The pull-down button 710 is displayed for each setting item. When the pull-down button 710 is selected, a pull-down menu 725 is displayed. In the pull-down menu 725, settings 770 are displayed, and one of the settings 770 is settable for the setting item corresponding to the selected pull-down button 710.

The OK button 720 is for instructing completion of the print setting. When the user selects the OK button 720 through the operation interface 14, a command to execute printing is transmitted to the MFP 30 via the communication interface 18.

(Notes about Description)

In the following description, the phrase "the CPU 12 of the PC 10" or the phrase "the PC 10" may also signify "the CPU 12 of the PC 10 executing a program such as the application 24, the OS 22, or the printer driver 26." In this specification, the phrase "the CPU 12 receives various information" covers such technical details as the CPU 12 of the PC 10 acquiring various information via the communication terminal interface 18. Similarly, the phrase "the CPU 12 of the PC 10 transmits various information" covers such technical details as the CPU 12 of the PC 10 outputting various information via the communication interface 18.

Here, definitions will be provided for the terms "data" and "information". In this specification, "information" is used as a broader concept of "data". Accordingly, "data A" may be replaced with "information A." Further, "information" is treated as the same information for different formats of "data" (e.g., a text format, binary format, or flag format), provided that the content of the data can be recognized as being the same. For example, the data "RESOLUTION=300" in the text format and the data "100101100" in the binary format are the same information provided that the device handling the data treats the data as information specifying that the resolution for reading an original is 300. However, the distinction between "data" and "information" described above is not strictly enforced; exceptions to the rule may be allowed.

(Processes by Printer Driver 26)

Figure 6:
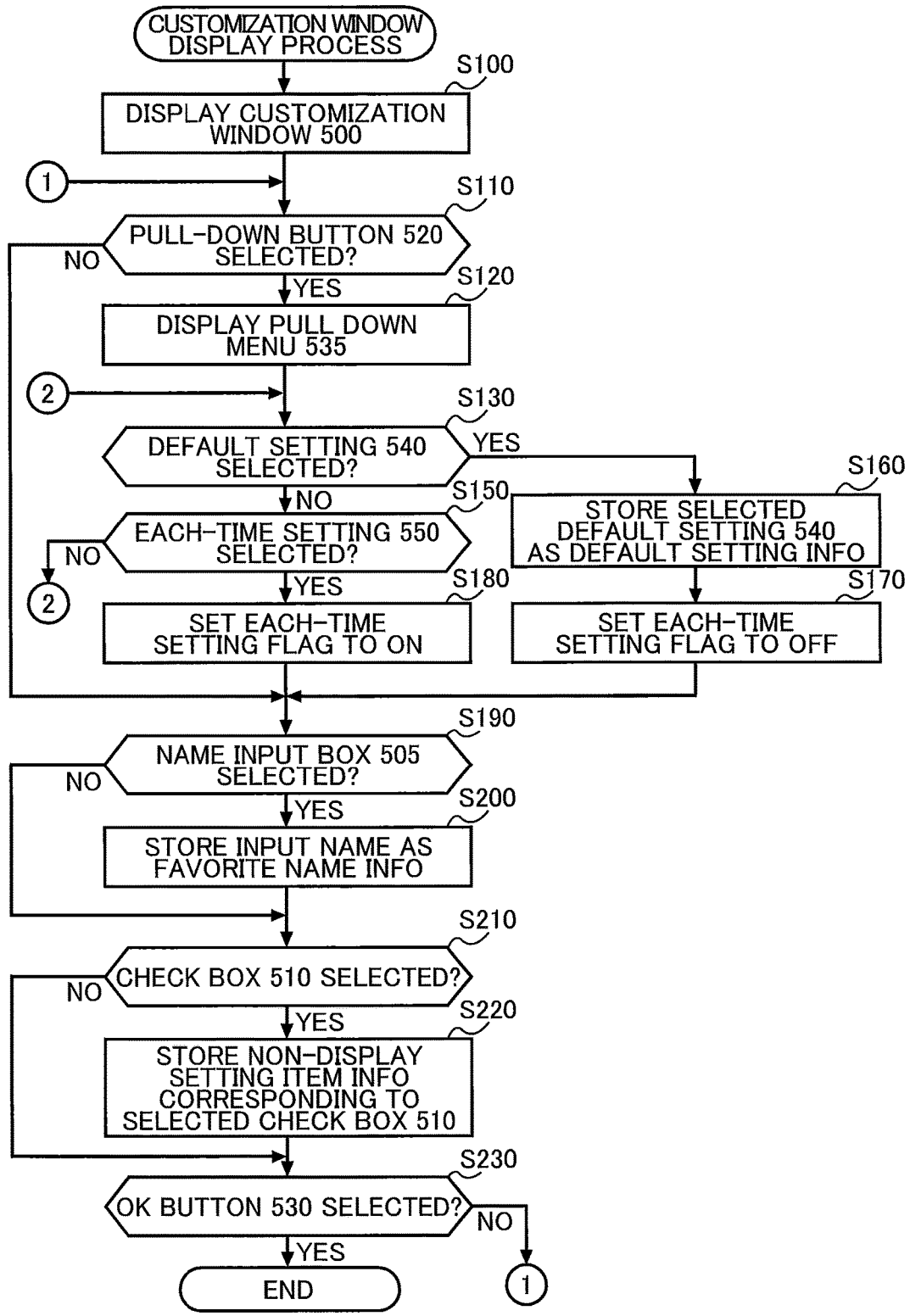
FIG. 6 is a flowchart illustrating a customization window display process according to the first embodiment.

The following describes processes that the CPU 12 of the PC 10 performs by executing the printer driver 26. The CPU 12 is configured to load and execute the printer driver 26 at a specific timing. When the CPU 12 receives, through the operation interface 14, a specific operation (e.g., selection of a predetermined button) to display the customization window 500 during execution of the printer driver 26, the CPU 12 is configured to determine that an instruction to display the customization window 500 has been received and starts a customization window display process shown in FIG. 6.

<Customization Window Display Process>

In S100, the CPU 12 displays the customization window 500 illustrated in FIG. 3A on the display 16. The CPU 12 newly creates "favorite" information whose setting items are set to "reference settings" stored in the storage 20. That is, each default setting information of the newly created "favorite" information is initially equal to the "reference setting". The non-display setting item information indicates that all of the setting items set to be displayed in the newly created "favorite" information. In the following steps|, the newly created "favorite" is updated on the basis of the user's operation.

The CPU 12 waits until the CPU 12 receives, through the operation interface 14, the selection of any one of the pull-down buttons 520, the name input box 505, the check boxes 510, and the OK button 530 (S110: NO, S190: NO, S210: NO, S230: NO).

When receiving the selection of the pull-down button 520 through the operation interface 14 (S110: YES), in S120 the CPU 12 displays the pull-down menu 535 in which the default settings 540 and the each-time setting 550 are displayed in a selectable manner on the display 16, as illustrated in FIG. 3B. One of the default settings 540 is settable for the setting item corresponding to the selected pull-down button 520. The CPU 12 waits until the CPU 12 receives, through the operation interface 14, the selection of any one of the default settings 540 and each-time setting 550 (S130: NO, S150: NO).

When receiving the selection of the default setting 540 through the operation interface 14 (S130: YES), in S160 the CPU 12 stores in the "favorite" information defined in S100 the default setting 540 as the default setting information for the setting item corresponding to the pull-down button 520 selected in S110. Accordingly, the default setting 540 received in S130 is stored as the default setting information in association with the name of the "favorite". In S170, the CPU 12 sets the each-time setting flag to the "OFF" for the setting item corresponding to the pull-down button 520 selected in S110. On the other hand, when receiving the selection of the each-time setting 550 (S150: YES), in S180 the CPU 12 sets the each-time setting flag in the "favorite" information defined in S110 to the "ON" for the setting item corresponding to the pull-down button 520 selected in S110.

When receiving the selection of the name input box 505 through the operation interface 14 (S190: YES), in S200 the CPU 12 receives an input of the name of the created "favorite" from the user through the operation interface 14 and stores the input name as the "favorite" name information in the "favorite" information defined in S110. The "favorite" name information indicates the name of the "favorite" defined in S100.

When receiving the selection of the check box 510 through the operation interface 14 (S210: YES), in S220 the CPU 12 updates the non-display setting item information in the "favorite" information defined in S100 so that the non-display setting item information includes information indicating that the setting item corresponding to the selected check box 510 is not displayed. In the embodiment, the non-display setting item information includes the setting item which corresponds to the check box 510 selected in S210. That is, when a setting item is included in the non-display setting item information, the CPU 12 determines that the setting item included in the non-display setting item is the setting item displayed in neither the each time setting window 600 nor the detailed setting window 700. Accordingly, the setting item corresponding to the selected check box 510 is stored in association with the name of the "favorite" in the storage 20.

When receiving the selection of the OK button 530 through the operation interface 14 (S230: YES), the CPU 12 closes the customization window 500 and ends the customization window display process. As explained above, the "favorite" information is newly defined in S100, and then the defined "favorite" information is updated through steps S16, S200, and S220.

<Each-Time Setting Window Display Process>

Figure 7:
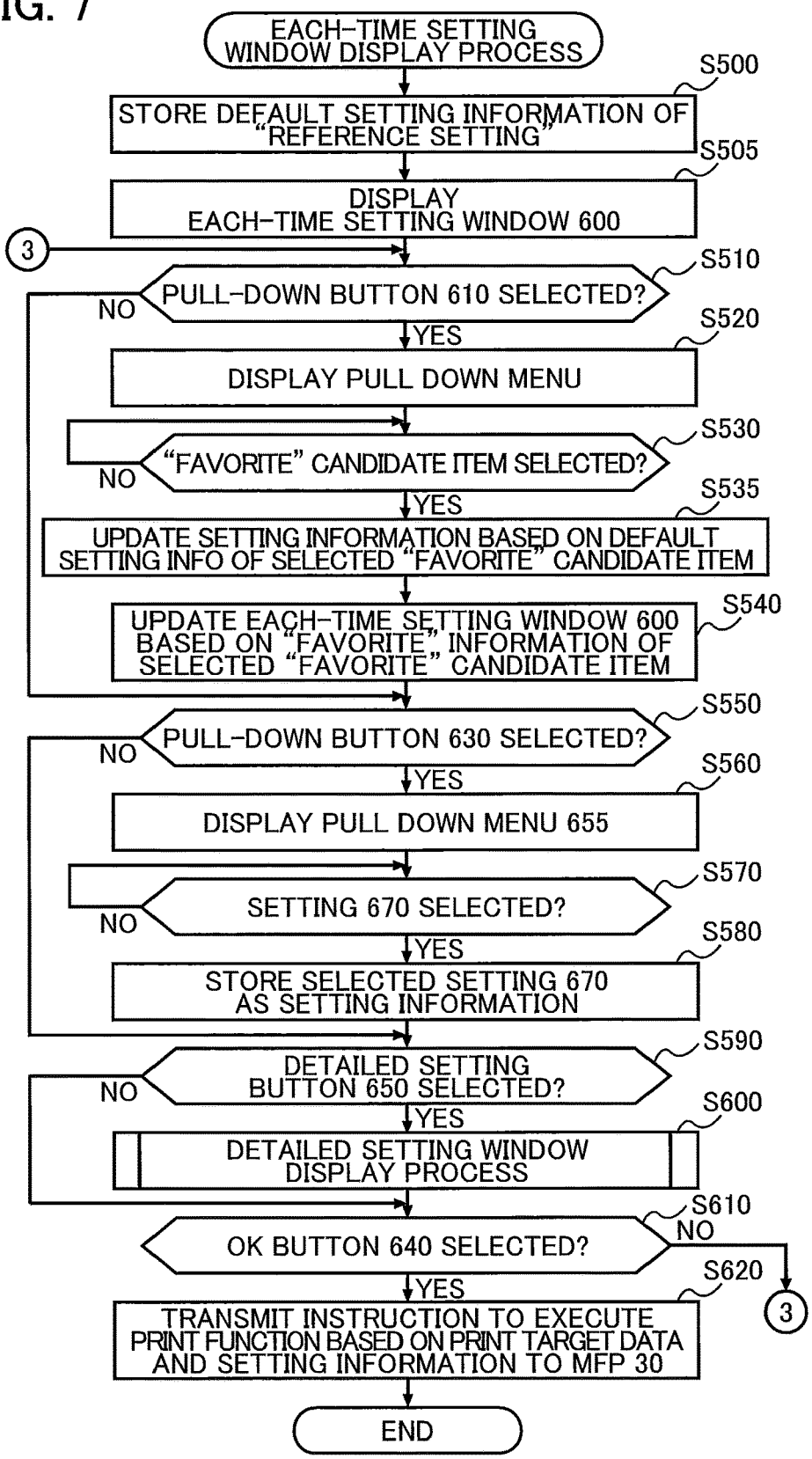
FIG. 7 is a flowchart illustrating an each-time setting window display process according to the first embodiment.

The following describes an each-time setting window display process for displaying the each-time setting window 600. The CPU 12 receives an instruction (e.g., selection of a predetermined button) to make the MFP 30 print print-target data which has been created using the application 24 during execution of the printer driver 26. Thereafter, the CPU 12 acquires the print-target data and starts the each-time setting window display process of FIG. 7.

In S500, the CPU 12 obtains information from the "reference setting", and newly stores the obtained information (including the setting information of the "reference setting") as initial information.

In S505, the CPU 12 displays the each-time setting window 600 illustrated in FIG. 4A based on the initial information. More specifically, in the "reference setting", there is neither setting item for which the each-time setting nor non-display setting item has been set. So, no setting item is prohibited from being set in the initial each-time setting window 600. The CPU 12 waits until the CPU 12 receives the selection of any one of the pull-down button 610, the pull-down button 630, the detailed setting button 650, and the OK button 640 through the operation interface 14 (S510: NO, S550: NO, S590: NO, S610: NO).

When receiving the selection of the pull-down button 610 through the operation interface 14 (S510: YES), in S520 the CPU 12 displays, on the display 16, a pull-down menu (not illustrated). The pull-down menu displays a list of "favorite" candidate items in a selectable manner. The "favorite" candidate items indicate the names of the "favorites". Each "favorite" has been created in the customization window display process. The CPU 12 waits until the CPU 12 receives the selection of the "favorite" candidate item through the operation interface 14 (S530: NO). When receiving the selection of the "favorite" candidate item (S530: YES), in S535 the CPU 12 updates the setting information on the basis of the default setting information of the selected "favorite" candidate item. Thereafter, in S540 the CPU 12 updates the each-time setting window 600 on the basis of the "favorite" information of the selected "favorite" candidate item. Specifically, the CPU 12 displays each setting item which is not included in the non-display setting item information of the "favorite" information. In this case, setting of each setting item, whose each-time setting flag is set to the "ON", is displayed in a settable manner on the each-time setting window 600.

When receiving the selection of the pull-down button 630 (S550: YES), in S560 the CPU 12 displays the pull-down menu 655 as illustrated in FIG. 4B. On the pull-down menu 655, settings 670 for the setting item corresponding to the selected pull-down button 630 are displayed in a selectable manner. Then, the CPU 12 waits until the CPU 12 receives the selection of the setting 670 through the operation interface 14 (S570: NO).

When receiving the selection of the setting 670 (S570: YES), in S580 the CPU 12 stores the setting 670 selected in S570 as the setting information for the setting item corresponding to the pull-down button 630 selected in S550.

When receiving the selection of the detailed setting button 650 (S590: YES), in S600 the CPU 12 performs a detailed setting window display process.

When receiving the OK button 640 (S610: YES), in S620 the CPU 12 is configured to transmit a command to execute a print function based on the print-target data and setting information determined through S500-S610 to the MFP 30 through the communication interface 18. More specifically, the CPU 12 closes the each-time setting window 600 displayed on the display 16. The CPU 12 generates a print command that enables the MFP 30 to interpret based on the print-target data that has been acquired from the application 24 through the OS 22 and on the setting information stored and updated in the storage 20 through S500-S610. Then, the CPU 12 transmits the generated print command to the MFP 30 through the communication interface 18 and ends the each-time setting window display process. The print command serves also as a command to allow the MFP 30 to execute the print function.

<Detailed Setting Window Display Process>

Figure 8:
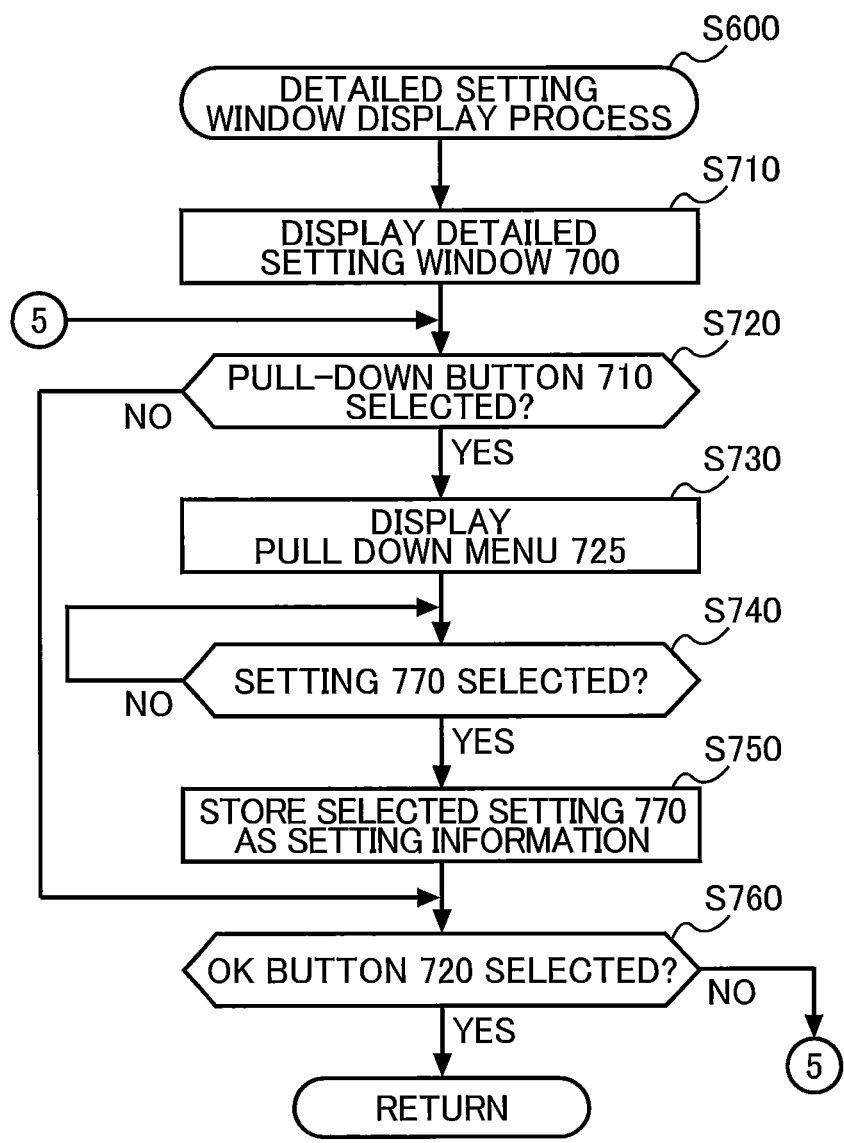
FIG. 8 is a flowchart illustrating a detailed setting window display process according to the first embodiment.

The detailed setting window display process will be explained while referring to FIG. 8.

In S710, the CPU 12 displays on the display 16 the detailed setting window 700 based on the "favorite" information selected in S530. Specifically, the CPU 12 displays each setting item which is not included in the non-display setting item information on the detailed setting window 700. In this case, setting of each displayed setting item is displayed in a settable manner on the detailed setting window 700 provided that the each-time setting flag has been set to the "OFF" for the displayed setting item. The CPU 12 waits until the CPU 12 receives the selection of any one of the pull-down buttons 710 and the OK button 720 (S720: NO, S760: NO).

When receiving the selection of the pull-down button 710 through the operation interface 14 (S720: YES), in S730 the CPU 12 displays the pull-down menu 725. In the pull-down menu 725, the settings 770 for the setting item corresponding to the selected pull-down button 710 are displayed in a selectable manner. Thereafter, the CPU 12 waits until the CPU 12 receives the selection of the setting 770 (S740: NO).

When receiving the selection of the setting 770 through the operation interface 14 (S740: YES), in S750 the CPU 12 stores the setting 770 selected in S740 as the setting information for the setting item corresponding to the pull-down button 710 selected in S720.

When receiving the selection of the OK button 720 through the operation interface 14 (S760: YES), the CPU 12 closes the detailed setting window 700 displayed on the display 16 and returns to the each-time setting window display process.

(Effects of First Embodiment)

Displaying the each-time setting window 600, in a case where receiving the instruction to execute the print function enables user to set for only the setting item(s) for which the each-time setting has (have) been set. Displaying detailed setting window 700, in a case the detailed setting button 650 is selected after the instruction to execute the print function is received via the operation interface 14, enables user to set for only the setting item(s) for which the each-time setting has (have) not been set. In a case where the detailed setting button 650 is selected, the CPU 12 transmits to the MFP 30 the command to execute the print function based on settings set through the each-time setting window 600 and settings set through the detailed setting window 700. On the other hand, in a case where the detailed setting button 650 is not selected, the CPU 12 transmits to the MFP 30 the command to execute the print function based on settings set through the each-time setting window 600 and the default settings. Thus, by performing the each-time setting for a desired setting item, the setting can be set for each desired setting item on the each-time setting window 600 without searching for the desired setting item from a plurality of setting items. On the other hand, on the detailed setting window 700, the setting(s) can be set for the setting item(s) other than the desired setting item(s), for which the each-time setting has not been set. Therefore, both a demand to save the trouble of searching for the desired setting item and a demand to perform the setting for the setting item other than the desired setting item can be satisfied.

[Second Embodiment]

In the first embodiment, the printer driver 26 is used to perform various processes. In the second embodiment, the application is used to perform various processes. Further, in the first embodiment, when the detailed setting button 650 displayed on the each-time setting window 600 is selected, the detailed setting window 700 is displayed. In the second embodiment, an each-time setting window 1300 (FIG. 11D) is displayed after the user instructs the execution of the print function. Further, in the first embodiment, the user may previously store a combination of the default settings and the setting items whose setting are to be displayed in a settable manner by using the "favorite setting registration function". In the second embodiment, the setting of the print function is performed more simply without using the "favorite".

In the following description, like parts and components are designated with the same reference numerals as the first embodiment to avoid duplicating description.

Figure 9:
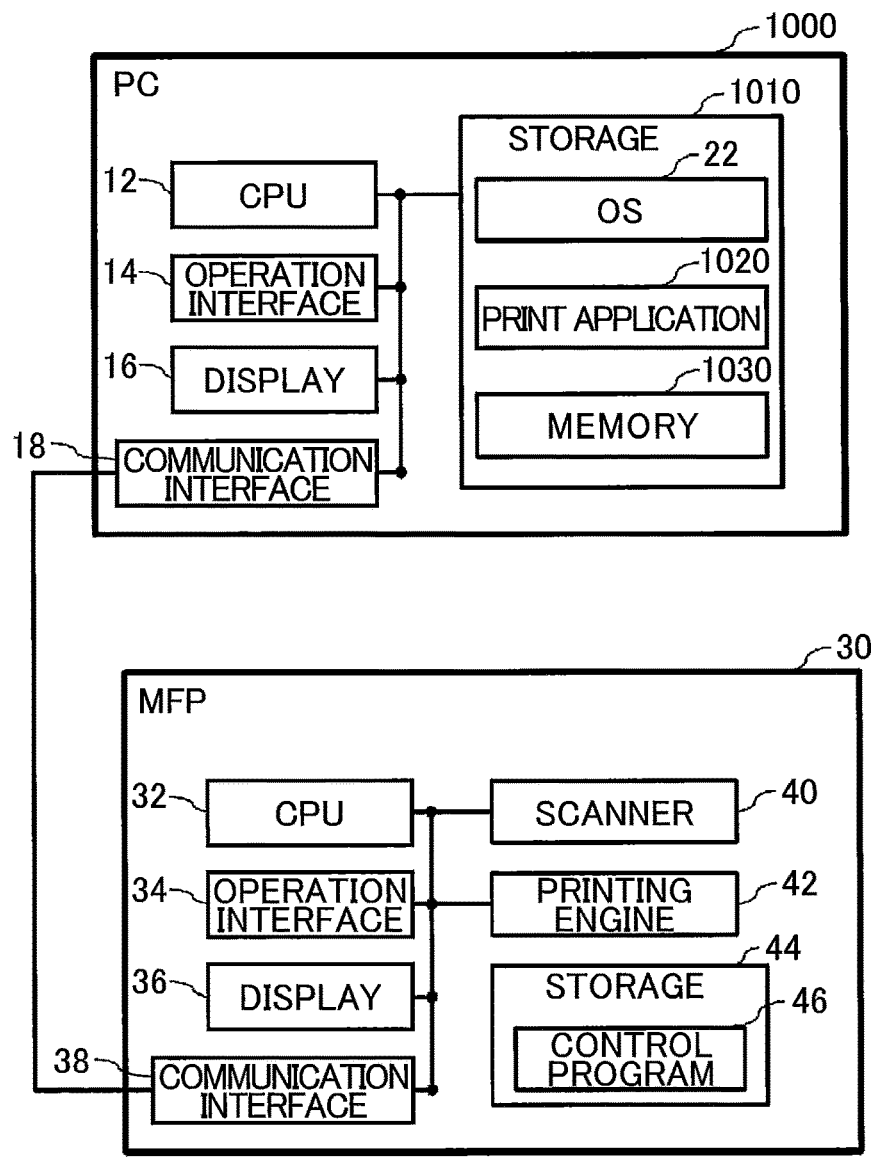
FIG. 9 is a block diagram illustrating a PC and an MFP according to a second embodiment.

FIG. 9 is a block diagram illustrating a PC 1000 and the MFP 30. The PC 1000 includes a storage 1010 storing the OS 22 and a print application 1020. The storage 1010 includes a memory 1030. The print application 1020 is installed on the PC 1000. The application 1020 is an example of a program.

Figure 10:
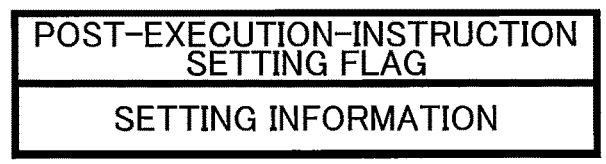
FIG. 10 is an explanatory diagram illustrating information stored in a storage of the PC according to the second embodiment.

In the second embodiment, the PC 1000 performs a print operation using the print function of the MFP 30 by executing the print application 1020 stored in the storage 1010. The CPU 12 is configured to function as various execution means or devices by reading the print application 1020. As illustrated in FIG. 10, the memory 1030 stores an each-time setting flag and setting information for each setting item.

(Preview Window 1100)

Figure 11A:
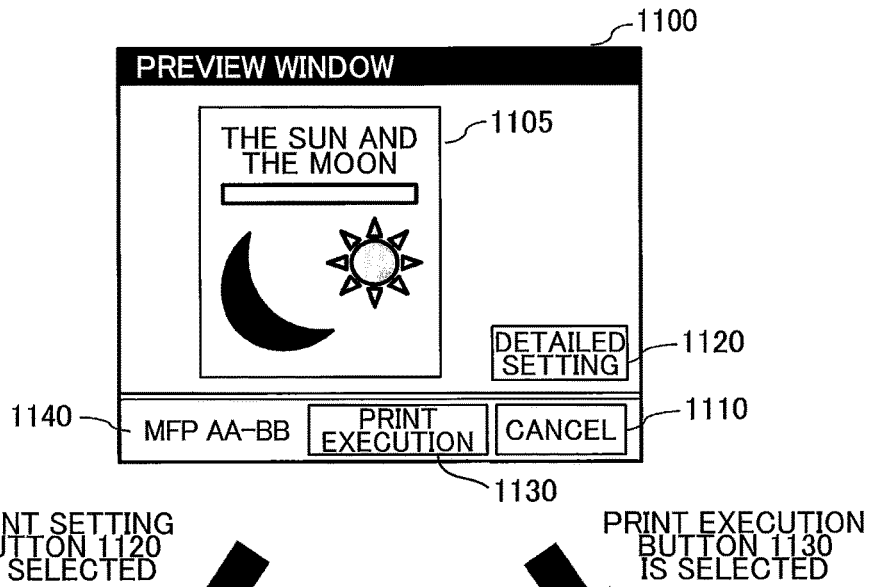
FIG. 11A is a view illustrating an example of a preview window according to the second embodiment.

FIG. 11A illustrates an example of a preview window 1100 displayed on the display 16. A menu window (not illustrated) is displayed on the display 16 when the application 24 is activated. After a user selects a device to execute the print function (e.g., the MFP 30) and selects data to be printed (print-target data) on a menu window (not illustrated), the preview window 1100 is displayed. The preview window 1100 includes a preview image 1105 based on the print-target data selected on the menu window (not illustrated), a detailed setting button 1120, a cancel button 1110, a print execution button 1130, and a model name 1140 of the MFP 30 executing printing.

The detailed setting button 1120 is for instructing display of a detailed setting window 1200. When the user selects the detailed setting button 1120 through the operation interface 14, the CPU 12 is configured to switch the window on the display 16 from the preview window 1100 to the detailed setting window 1200.

The cancel button 1110 is for instructing to cancel the print execution. When the user selects the cancel button 1110 through the operation interface 14, the CPU 12 is configured to switch the window on the display 16 from the preview window 1100 to the menu window (not illustrated).

The print execution button 1130 is for instructing the execution of the print function. When the CPU 12 is configured to receive a user's selection of the print execution button 1130, the CPU 12 is configured to switch the window on the display 16 from the preview window 1100 to the each-time setting window 1300 in a case where there is any setting item for which an each-time setting has been set. When the CPU 12 receives a user's selection of setting on the each-time setting window 1300, the CPU 12 is configured to transmit a command to execute the print function to the MFP 30 via the communication interface 18. On the other hand, when there is no setting item for which the each-time setting has been set, the CPU 12 is configured to transmit the command to execute the print function to the MFP 30 without displaying the each-time setting window 1300, and then ends the process.

(Detailed Setting Window 1200)

Figure 11B:
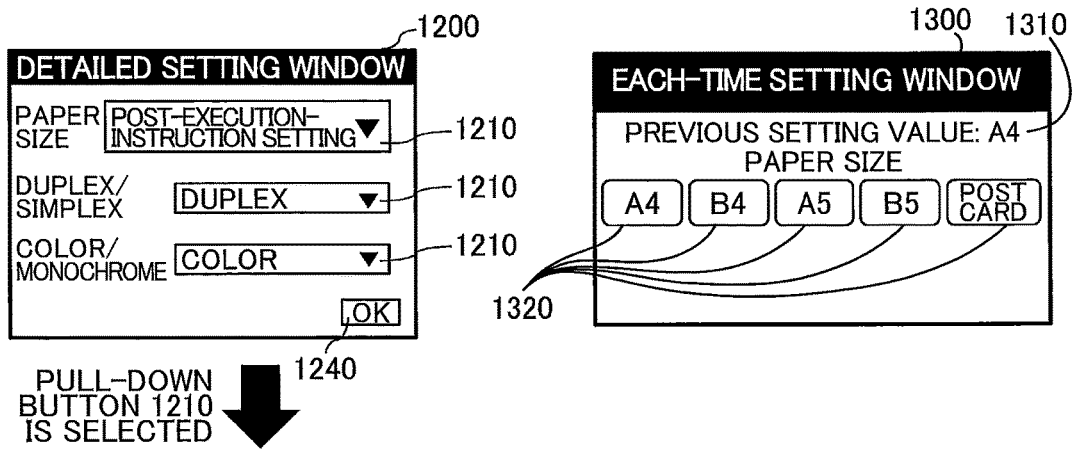
FIG. 11B is a view illustrating an example of a detailed setting window according to the second embodiment.

FIG. 11B illustrates an example of the detailed setting window 1200 displayed on the display 16.

The detailed setting window 1200 includes pull-down buttons 1210 and an OK button 1240. On the detailed setting window 1200, the user may select whether each setting item will be displayed on the each-time setting window 1300.

Figure 11C:
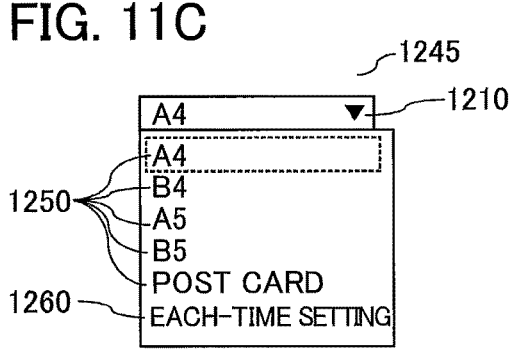
FIG. 11C is a view illustrating an example of a pull-down menu displayed when a pull-down button shown in FIG. 11B is selected.

The pull-down button 1210 is provided for each setting item. FIG. 11C illustrates an example of a pull-down menu 1245 displayed on the display 16 when the pull-down button 1210 is selected through the operation interface 14. On the pull-down menu 1245, settings 1250 for the setting item corresponding to the selected pull-down button 1210 and an each-time setting 1260 (hereinafter, referred to as each-time setting 1260) are displayed in a selectable manner. When the CPU 12 receives selection of the each-time setting 1260, the CPU 12 is configured to set the each-time setting flag to the "ON".

In the present disclosure, the phrase "to perform the each-time setting" indicates that the each-time setting flag associated with the setting item for which the each-time setting 1260 has been selected is set to the "ON".

The OK button 1240 is for instructing completion of the detailed setting. When the user selects the OK button 1240 through the operation interface 14, the CPU 12 is configured to switch the window on the display 16 from the detailed setting window 1200 to the preview window 1100. Through the user's operation using the detailed setting window 1200, one of settings 1250 and the each-time setting 1260 is set for each setting item. In other words, by using the detailed setting window 1200, the each-time setting flag is determined for each setting item, and/or setting information is determined for each setting item whose each-time setting flag is set to the "OFF".

(Each-Time Setting Window 1300)

FIG. 11D illustrates an example of the each-time setting window 1300 displayed on the display 16. On the each-time setting window 1300, the setting is settable for the setting item for which the each-time setting has been set. As shown in FIGS. 11A-11D, when the each-time setting 1260 for the setting item "paper size" is selected on the detailed setting window 1200, the each-time setting flag corresponding to the setting item "paper size" is set to the "ON". Thereafter, settings 1320 for the setting item "paper size" are displayed on the each-time setting window 1300 in a selectable manner. In response to the reception of the selection of any one of the settings 1320, the CPU 12 is configured to store the selected setting 1320 in the memory 1030 as the setting information of the setting item for which the each-time setting has been set. Then, the CPU 12 is configured to transmit to the MFP 30 a command to execute the print function based on the stored setting information. As a result, the user may instruct the setting for his or her desired setting item for which the each-time setting has been set and instruct the transmission of the print function execution command at a time by selecting the setting 1320. Accordingly, the user operability can be improved.

Figure 12:
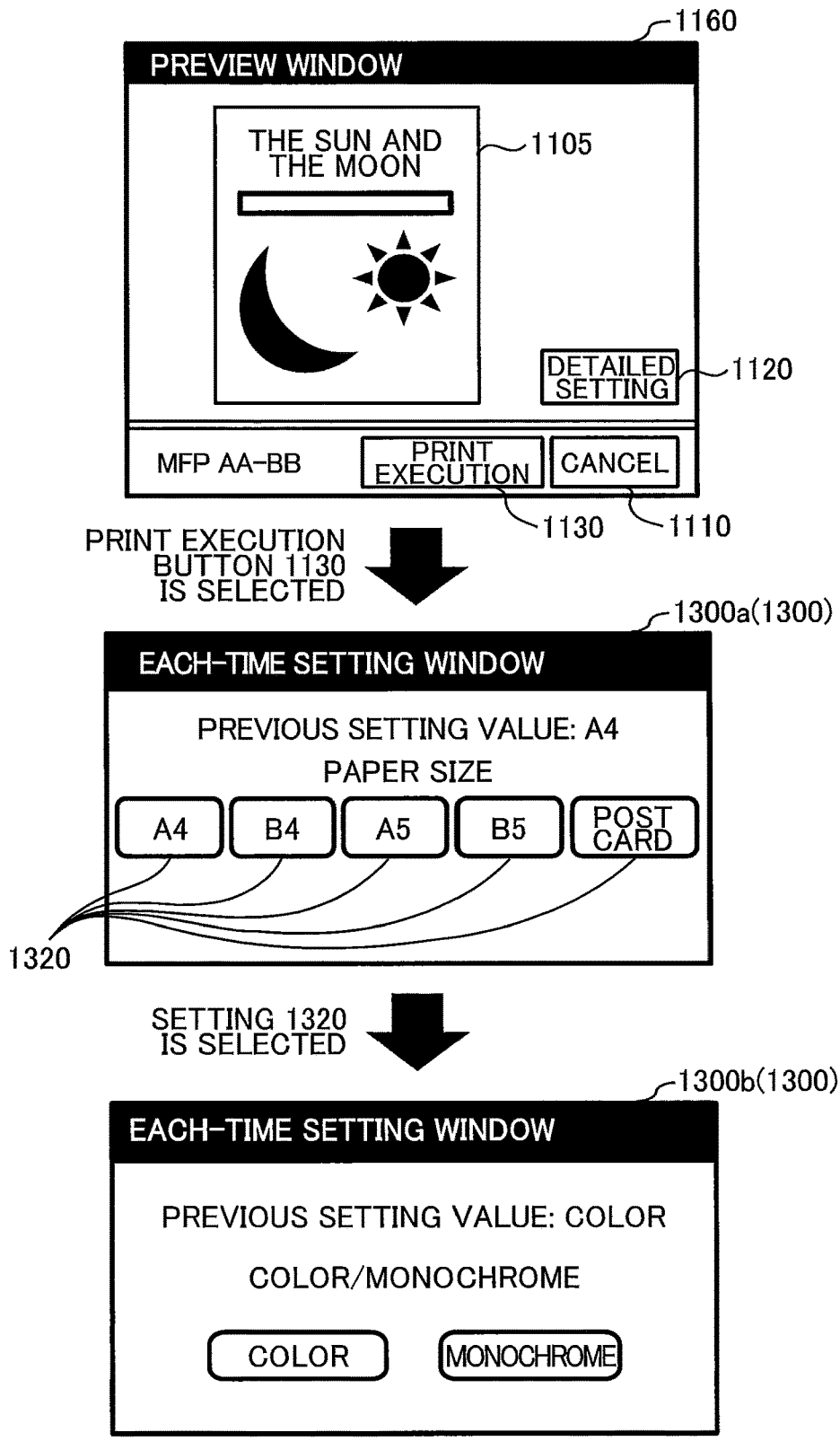
FIG. 12 is an explanatory diagram illustrating transition of a screen according to the second embodiment.

In the present embodiment, the user can perform the setting for only one setting item for which the each-time setting has been set on one each-time setting window 1300. The user may perform the each-time settings for two setting items "paper size" and "color/monochrome", on the detailed setting window 1200. In this case, as illustrated in FIG. 12, an each-time setting window 1300a is displayed after the print execution button 1130 is selected. On the each-time setting window 1300a, the setting item "paper size", which is the first setting item for which the each-time setting has been set, can be set. After the user performs setting for the setting item "paper size", an each-time setting window 1300b is displayed. On the each-time setting window 1300b, the setting item "color/monochrome", which is the second setting item for which the each-time setting has been set, can be set. After the user performs the setting for the setting item "color/monochrome", the print function execution command is transmitted. That is, only one setting item can be set on one each-time setting window 1300. Even when there are a plurality of desired setting items, the user can perform the setting for each of the desired setting items without the trouble of searching the plurality of desired setting items on the displayed each-time setting window 1300.

(Process by Print Application 1020)

<Print Process>

Figure 13:
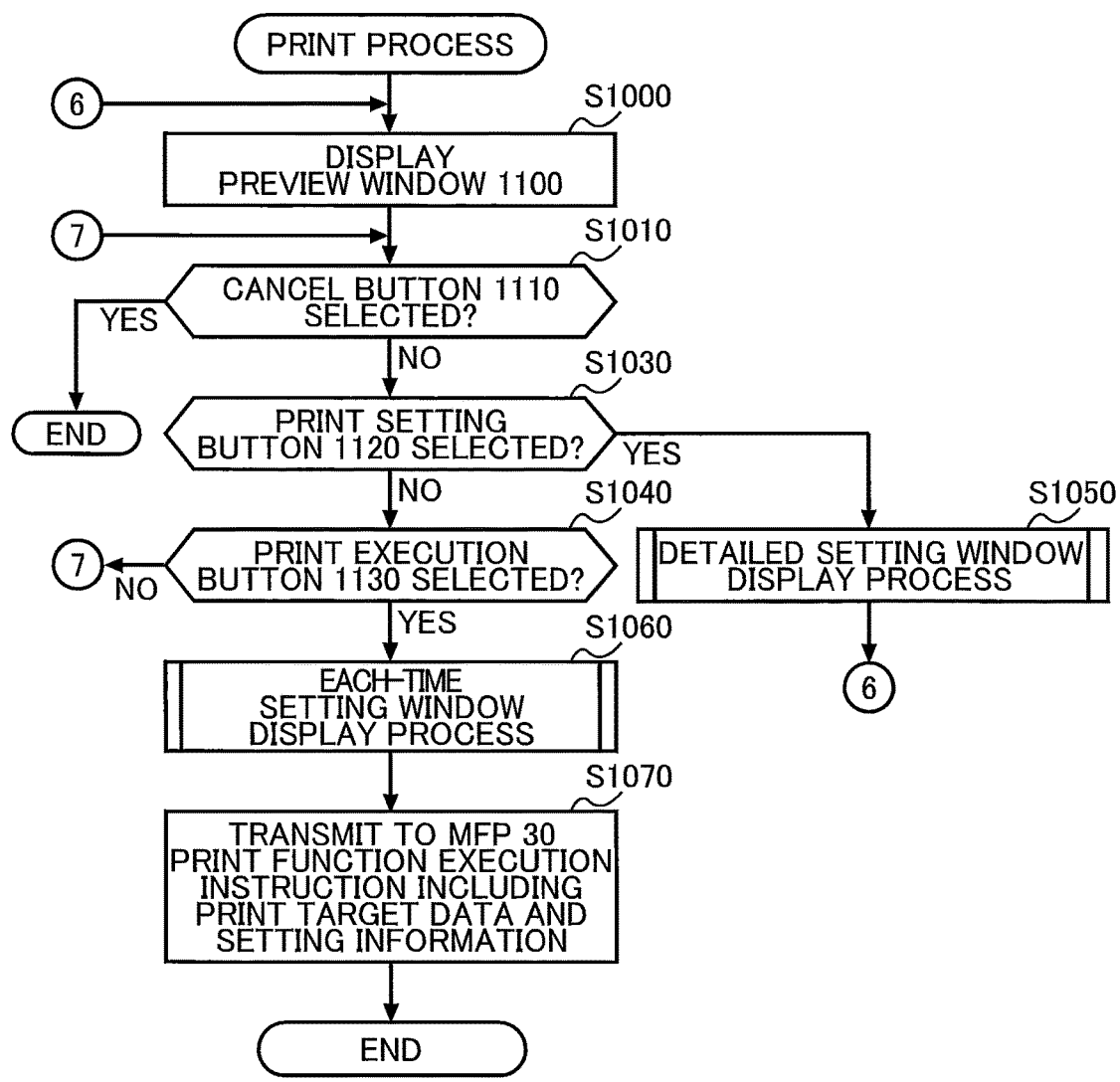
FIG. 13 is a flowchart illustrating a print process according to the second embodiment.

FIG. 13 is a flowchart illustrating an example of a print process. The print process of FIG. 13 is started as follows. That is, the MFP 30 as a communication counterpart device is selected on the menu window (not illustrated) on the display 16, and communications are established between the PC 1000 and the MFP 30. Subsequently, print-target data is selected on the same window, and then the print process is started.

In S1000, the CPU 12 displays the preview window 1100 illustrated in FIG. 11A on the display 16. The CPU 12 waits until the CPU 12 receives the selection of any one of the cancel button 1110, the print setting button 1120, and the print execution button 1130 through the operation interface 14 (S1010: NO, S1030: NO, S1040: NO).

When receiving the selection of the cancel button 1110 through the operation interface 14 while displaying the preview window 1100 (S1010: YES), the CPU 12 ends the print process and returns to the menu window (not illustrated).

When receiving the selection of the print setting button 1120 through the operation interface 14 (S1030: YES), in S1050 the CPU 12 executes a detailed setting window display process descried later with reference to FIG. 14.

When receiving the selection of the print execution button 1130 through the operation interface 14 while displaying the preview window 1100 (S1040: YES), in S1060 the CPU 12 executes an each-time setting window display process (hereinafter, simply referred to as "setting window display process") described later with reference to FIG. 15.

After completion of the setting window display process, the CPU 12 proceeds to S1070. In S1070, the CPU 12 transmits the print function execution command to the MFP 30 through the communication interface 18. The print function execution command includes the print-target data and the setting information indicating settings set on the detailed setting window 1200 and the each-time setting window 1300. Thereafter, the CPU 12 ends the print process. The setting information transmitted to the MFP 30 and the setting of the each-time setting flag are retained after the print process.

<Detailed Setting Window Display Process>

Figure 14:
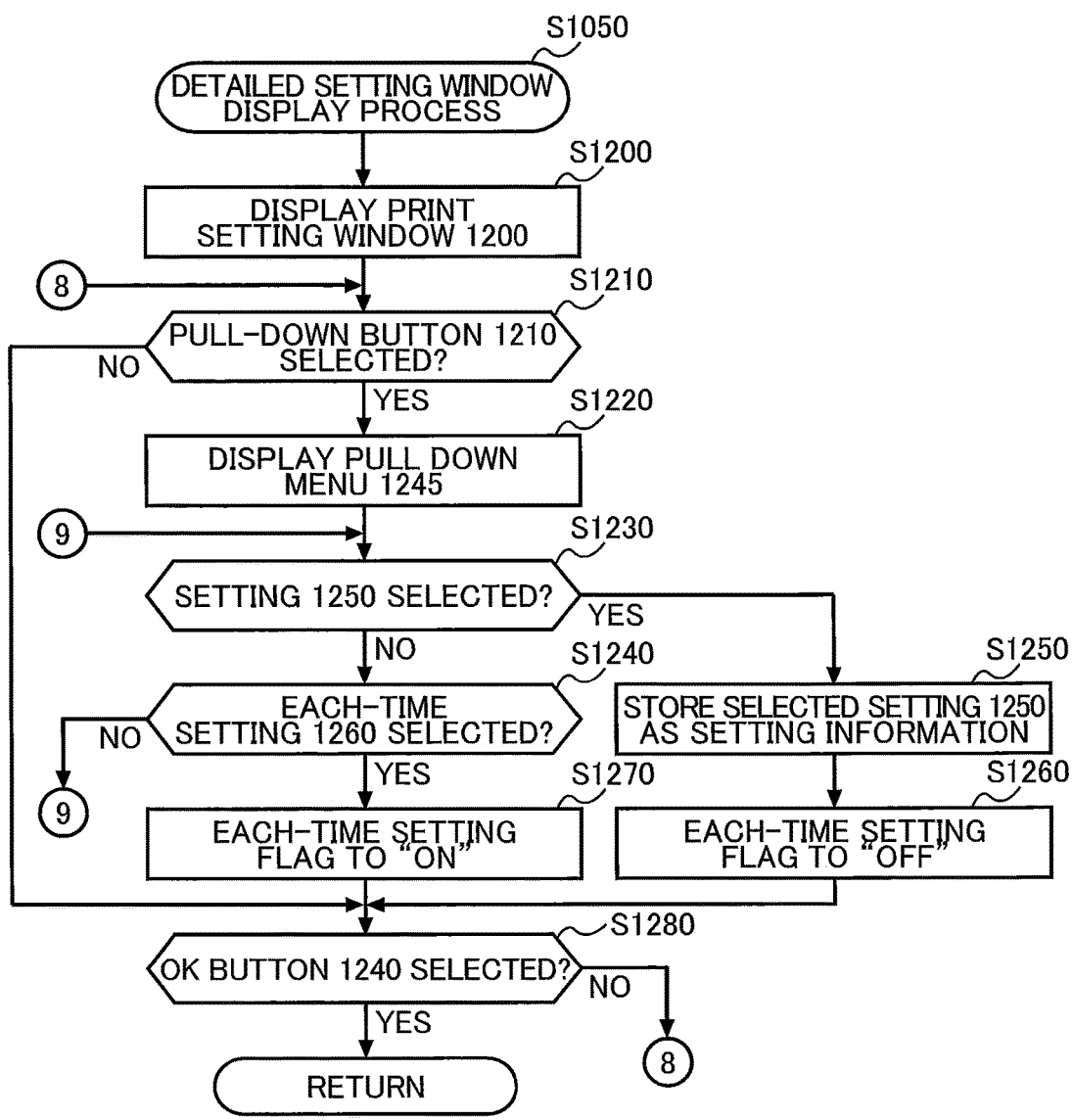
FIG. 14 is a flowchart illustrating a detailed setting window display process according to the second embodiment.

FIG. 14 is a flowchart illustrating an example of the detailed setting window display process.

In S1200, the CPU 12 displays the detailed setting window 1200 illustrated in FIG. 11B based on the initial setting information. The default setting information is stored in the storage 20. At the initial execution of the print process, the default setting information is obtained from the storage 20. Then the default setting information is newly stored as initial setting information in the storage 20. Here, the setting information and the each-time setting flags are updated in the print process (especially steps S1210-S1280). The updated setting information and the updated each-time setting flags are stored in the storage 20 each time the print process is ended. The setting information and the each-time setting flags, which are stored in the end of the previous print process, are used as initial setting information at the subsequent execution of the print process.

The CPU 12 waits until the CPU 12 receives the selection of any one of the pull-down buttons 1210 and the OK button 1240 through the operation interface 14 (S1210: NO, S1280: NO).

When receiving the selection of the pull-down button 1210 (S1210: YES), in S1220 the CPU 12 displays the pull-down menu 1245 on which the settings 1250 for the setting item corresponding to the selected pull-down button 1210 and the each-time setting 1260 are displayed on the display 16 in a selectable manner (FIG. 11C). The CPU 12 waits until the CPU 12 receives the selection of any one of the settings 1250 and the each-time setting 1260 through the operation interface 14 (S1230: NO, S1240: NO).

When receiving the selection of the setting 1250 (S1230: YES), in S1250 the CPU 12 stores the setting 1250 whose selection has been received in S1230 as the setting information of the setting item corresponding to the pull-down button 1210 whose selection has been received in S1210. In S1260, the CPU 12 sets the each-time setting flag to the "OFF" for the setting item corresponding to the pull-down button 1210 whose selection has been received in S1210. On the other hand, when receiving the selection of the each-time setting 1260 (S1240: YES), in S1270 the CPU 12 sets the each-time setting flag to the "ON" for the setting item corresponding to the pull-down button 1210 whose selection has been received in S1210.

When receiving the selection of the OK button 1240 (S1280: YES), the CPU 12 closes the detailed setting window 200, ends the detailed setting window display process, and returns to the print process.

<Setting Window Display Process>

Figure 15:
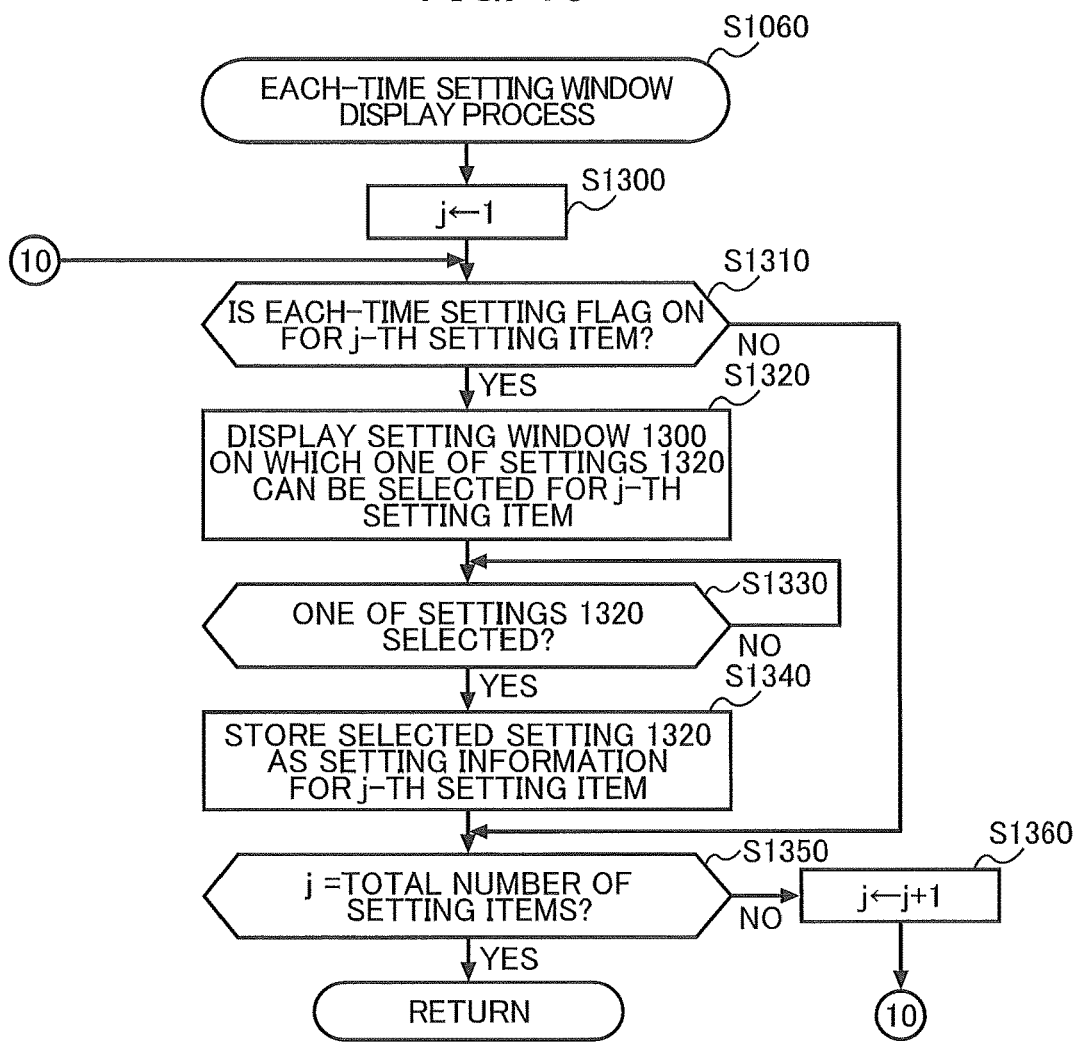
FIG. 15 is a flowchart illustrating an each-time setting window display process according to the second embodiment.

FIG. 15 is a flowchart illustrating an example of the setting window display process. In the setting window display process, the each-time setting window 1300 is displayed (FIG. 11D). On the each-time setting window 1300, the setting is settable for the setting item for which the each-time setting flag is set to the "ON".

In S1300, the CPU 12 substitutes 1 for a counter j. The counter j is used for indicating one of the plurality of setting items.

In S1310, the CPU 12 determines whether the each-time setting flag has been set to the "ON" for the j-th setting item. When making an affirmative determination in S1310 (S1310: YES), the CPU 12 proceeds to S1320. When making a negative determination in S1310 (S1310: NO), the CPU 12 proceeds to S1350.

In S1320, the CPU 12 displays the each-time setting window 1300 on which the settings 1320 that can be set for the j-th one of the plurality of setting items. For example, when the each-time setting 1260 is selected for the setting item "paper size", the CPU 12 displays, in a selectable manner, five settings 1320 of "A4", "B4", "A5", "B5", and "post card" which can be set for the setting item "paper size".

In S1330, the CPU 12 determines whether any one of the settings 1320 displayed on the each-time setting window 1300 has been selected through the operation interface 14. The CPU 12 waits until any one of the settings 1320 is selected through the operation interface 14 (S1330: NO).

When receiving the selection of the setting 1320 (S1330: YES), in S1340 the CPU 12 stores the setting 1320 whose selection has been received in S1330 as the setting information for the j-th setting item. Further, the CPU 12 closes the each-time setting window 1300 on which the setting can be set for the j-th setting item.

In S1350, the CPU 12 determines whether the counter j is greater than the total number of the setting items whose each-time setting flags are set to the "ON". When making a negative determination in S1350 (S1350: NO), in 51360 the CPU 12 increments the counter j and returns to S1310. On the other hand, when making an affirmative determination in S1350 (S1350: YES), the CPU 12 ends the setting window display process and returns to the print process. When a plurality of setting items are subjected to the each-time setting, the CPU 12 repeatedly displays the each-time setting window 1300 on which setting is settable for one of the setting items for which the each-time setting has been set until the settings for all the plurality of setting items are completed. Then, in response to the selection of the setting 1320 for the last one of the setting items for which the each-time setting has been set, the CPU 12 executes S1070 of the print process to transmit the print function execution command through the communication interface 18.

(Operation Example)

In the second embodiment, the following characteristic operation can be performed.

When the user wishes to change setting for a setting item in the subsequent print processes, the user can select the each-time setting 1260 for that setting item at the execution of the first print process (S1240: YES). Then, the CPU 12 sets the each-time setting flag to the "ON" and retains the setting of the each-time setting flag after completion of the print process. Thereafter, the user can transmit the print function execution command without selecting the print setting button 1120 on the preview window 1100 but only by selecting the print execution button 1130 and performing the setting for his or her desired setting item for which the each-time setting has been set on the each-time setting window 1300 to be displayed later. That is, when the settings are received via the displayed each-time setting window 1300 for the setting items displayed thereon, the print function of the MFP 30 can be executed without receiving an additional user operation such as an operation for selecting a button.

(Effects of Second Embodiment)

According to the second embodiment, the CPU 12 displays the each-time setting window 1300 after receiving, from the user, the selection of the print execution button 1130 instructing execution of the print function. Thus, the CPU 12 can call user's attention about the setting of his or her desired setting item every time the CPU 12 receives the print function execution command. Accordingly, the user is prevented from forgetting to perform the setting of the desired setting item.

According to the above embodiment, the settings 1250, which can be set for the setting item displayed on the detailed setting window 1200, and the each-time setting 1260 are displayed in a selectable manner. When any one of the settings 1250 is selected, the selected setting 1250 is received as the setting information. On the other hand, when the each-time setting 1260 is selected, the each-time setting is received. Thus, the user can perform the each-time setting for his or her desired setting item by an operation similar to selection of the setting 1250. Accordingly, the user can easily select the desired setting item to be set on the each-time setting window 1300.

While the disclosure has been described in detail with reference to the above embodiments, it would be apparent to those skilled in the art that various changes and modifications may be made thereto. The information processing apparatus for performing setting for various setting items may be any device that can perform wireless communication and has a device control function. As the PC 10 or PC 1000, a smartphone, a tablet PC, and the like can be used. Further, the device may be any device that has a function of performing the setting for a plurality of setting items, such as the MFP 30, a copying machine, a printer, a scanner, or a facsimile device.

In the above embodiments, when the setting 670, 770, 1250, or 1320 is selected, the selected setting is stored as the setting information. Alternatively, a setting value that the user directly inputs through the operation interface 14 may be stored as the setting information.

In the above embodiments, the settings are performed for setting items concerning the print function. Alternatively, the settings may be performed for a plurality of setting items such as a reading function or a facsimile function.

Figure 16:
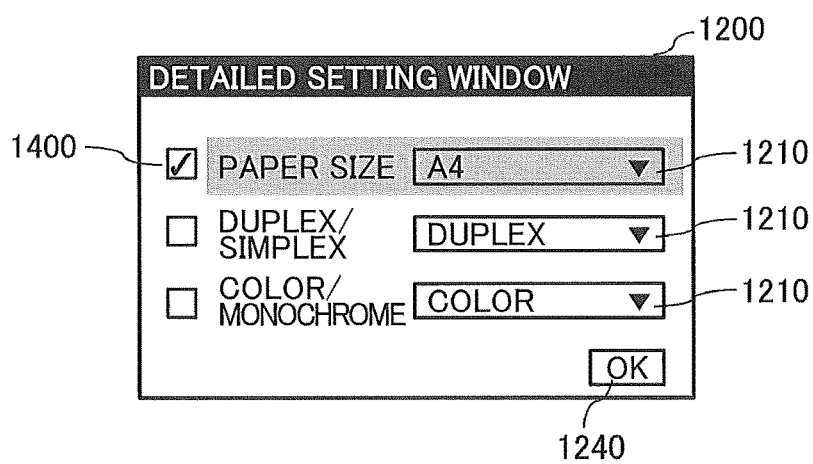
FIG. 16 is a view illustrating a detailed setting window according to the modification.

In the above embodiments, when the each-time setting 550 or the each-time setting 1260 is selected, the each-time setting or each-time setting is set. However, as illustrated in FIG. 16, the CPU 12 may select the each-time setting or each-time setting for a setting item when the user selects a check box 1400, which corresponds to that setting item and is displayed on the detailed setting window 1200, through the operation interface 14.

The technical elements described in the present specification or drawings exhibit technical utility either independently or in various combinations and shall not be limited to the combinations set forth in the claims at the time of filing. Further, the technology illustrated in the specification or drawings achieves multiple objects at the same time, and achieving one of the objects itself demonstrates technical utility.

In the above second embodiment, the setting item for which the each-time setting has been set is not displayed while displaying the detailed setting window 1200. Alternatively, the setting item, for which the each-time setting has been set, may be displayed in a grayed-out manner so that setting of the setting item cannot be set.

What is claimed is:

1. A non-transitory computer-readable recording medium storing computer-readable instructions for an information processing apparatus, the information processing apparatus comprising an operation interface, a display, a communication interface configured to communicate with an image processing device having an image processing function which is performed with settings for a plurality of setting items, a processor, and a storage storing a default setting for each of the plurality of setting items, wherein the computer-readable instructions, when executed by the processor, cause the information processing apparatus to perform:

displaying a classification window on the display;
    classifying each of the plurality of setting items into one of a first type and a second type based on a designation operation received by the operation interface and the classification window, the plurality of setting items including a first setting item classified into the first type and a second setting item classified into the second type;
    displaying an each-time setting window on the display each time an execution instruction is received via the operation interface, the execution instruction being to execute the image processing function, the each-time setting window being based on a result of the classifying and used for setting a first setting for the first setting item which is classified into the first type;
    receiving, through the operation interface, the first setting for the first setting item, which is classified into the first type among the plurality of setting items, via the displayed each-time setting window;
    displaying a detailed setting window on the display in a case where a display instruction is received through the operation interface after the execution instruction is received, the detailed setting window being based on the result of the classifying and used for setting a second setting for the second setting item, which is classified into the first type;
    receiving, through the operation interface, a second setting for the second setting item, which is classified into the second type, via the displayed detailed setting window;
    transmitting a first execution command of the image processing function to the image processing device in a case where the display instruction is received through the operation interface, the first execution command being to execute the image processing function based on the first setting set for the first setting item and the second setting set for the second setting item; and transmitting a second execution command of the image processing function to the image processing device in a case where the display instruction is not received through the operation interface, the second execution command being to execute the image processing function based on the first setting for the first setting item and the default setting for the second setting item.

2. The non-transitory computer-readable recording medium according to claim 1, wherein when the first setting for the first setting item is received via the displayed each-time setting window, the first execution command or the second execution command is transmitted to the image processing device without receiving an additional user operation.

3. The non-transitory computer-readable recording medium according to claim 1, wherein the plurality of setting items includes an item for setting a paper size.

4. The non-transitory computer-readable recording medium according to claim 1, wherein the image processing function includes a print function.

5. The non-transitory computer-readable recording medium according to claim 1, wherein after receiving the designation operation, the receiving a first setting and the receiving a second setting are performed.

6. The non-transitory computer-readable recording medium according to claim 1, wherein the receiving a first setting is performed prior to the receiving a second setting.

7. An information processing apparatus comprising:
an operation interface;
a display;
a communication interface configured to communicate with an image processing device having an image processing function which is performed with settings for a plurality of setting items;
a processor; and
a storage storing a default setting for each of the plurality of setting items, and computer readable instructions;
wherein the computer readable instructions, when executed by the processor, cause the information processing apparatus to perform:
displaying a classification window on the display;
classifying each of the plurality of setting items into one of a first type and a second type based on a designation operation received by the operation interface and the classification window, the plurality of setting items including a first setting item classified into the first type and a second setting item classified into the second type;
displaying an each-time setting window on the display each time an execution instruction is received via the operation interface, the execution instruction being to execute the image processing function, the each-time setting window being based on a result of the classifying and used for setting a first setting for the first setting item, which is classified into the first type;
receiving, through the operation interface, the first setting for the first setting item, which is classified into the first type among the plurality of setting items, via the displayed each-time setting window;
displaying a detailed setting window on the display in a case where a display instruction is received through the operation interface after the execution instruction is received, the detailed setting window being based on the result of the classifying and used for setting a second setting for the second setting item, which is classified into the first type;

receiving, through the operation interface, a second setting for the second setting item, which is classified into the second type, via the displayed detailed setting window;

transmitting a first execution command of the image processing function to the image processing device in a case where the display instruction is received through the operation interface, the first execution command being to execute the image processing function based on the first setting set for the first setting item and the second setting set for the second setting item; and transmitting a second execution command of the image processing function to the image processing device in a case where the display instruction is not received through the operation interface, the second execution command being to execute the image processing function based on the first setting for the first setting item and the default setting for the second setting item.

8. A non-transitory computer-readable recording medium storing computer-readable instructions for an information processing apparatus, wherein the information processing apparatus includes an operation interface, a display, a communication interface configured to communicate with an image processing device having an image processing function which is performed with settings for a plurality of setting items, a processor, and a storage storing a default setting for each of the plurality of setting items, wherein the computer-readable instructions, when executed by the processor, cause the information processing apparatus to perform:

displaying a classification window on the display;

determining whether each of the plurality of setting items is classified into a specific type based on a designation operation received by the operation interface and the classification window, the plurality of setting items including a first setting item classified into the specific type and a second setting item which is not classified into the specific type;

receiving, through the operation interface, a second setting for the second setting item, which is not classified into the specific type, via the classification window;

displaying an each-time setting window on the display each time an execution instruction is received via the operation interface, the execution instruction being to execute the image processing function, the each-time setting window being based on a result of the classifying and used for setting a first setting for the first setting item which is classified into the first type;

receiving, through the operation interface, the first setting for the first setting item, which is classified into the first type among the plurality of setting items, via the displayed each-time setting window;

transmitting a first execution command of the image processing function to the image processing device in a case where the receiving the second setting is performed, the first execution command being to execute the image processing function based on the first setting set for the first setting item and the second setting set for the second setting item; and transmitting a second execution command of the image processing function to the image processing device in a case where the receiving the second setting is not performed, the second execution command being to execute the image processing function based on the first setting for the first setting item and the default setting for the second setting item.

9. The non-transitory computer-readable recording medium according to claim 8, wherein the designation operation classifies into the specific type a plurality of designated setting items among the plurality of setting items, the plurality of designated setting items corresponding to respective ones of a plurality of each-time setting windows; and
wherein the displaying of the each-time setting window is repeated a plurality of times so that the plurality of each-time setting windows is displayed individually, a setting for one of the plurality of setting items being set through the each-time setting window corresponding to the one of the plurality of setting items.

10. The non-transitory computer-readable recording medium according to claim 8, wherein the execution instruction includes image data; and
wherein the computer-readable instructions, when executed by the processor, cause the information processing apparatus to further perform:
displaying a preview window including a preview image based on the image data, a detailed setting button and an execution button for instructing execution of the image processing function; and
receiving selection of one of the detailed setting button and the execution button,
wherein the displaying of a classification window is performed when selection of the detailed setting button is received, whereas the displaying of the each-time setting window is performed when selection of the receiving the execution button is received.

* * * * *